US012129973B2

(12) United States Patent
Maeno et al.

(10) Patent No.: US 12,129,973 B2
(45) Date of Patent: Oct. 29, 2024

(54) LIQUEFIED FLUID SUPPLY SYSTEM AND LIQUEFIED FLUID-SPRAYING APPARATUS

(71) Applicants: IHI Corporation, Tokyo (JP); AIR WATER INC., Osaka (JP)

(72) Inventors: Jun Maeno, Tokyo (JP); Akira Sadaki, Tokyo (JP); Leona Gohda, Osaka (JP); Shinya Kawahara, Osaka (JP)

(73) Assignees: IHI Corporation, Tokyo (JP); AIR WATER INC., Osaka (JP)

( * ) Notice: Subject to any disclaimer, the term of this patent is extended or adjusted under 35 U.S.C. 154(b) by 991 days.

(21) Appl. No.: 16/965,902

(22) PCT Filed: Jan. 29, 2019

(86) PCT No.: PCT/JP2019/002898
§ 371 (c)(1),
(2) Date: Jul. 29, 2020

(87) PCT Pub. No.: WO2019/151216
PCT Pub. Date: Aug. 8, 2019

(65) Prior Publication Data

US 2021/0041067 A1 Feb. 11, 2021

(30) Foreign Application Priority Data

Jan. 31, 2018 (JP) ................................ 2018-015682

(51) Int. Cl.
*F17C 7/04* (2006.01)
*F17C 13/04* (2006.01)

(52) U.S. Cl.
CPC ................ *F17C 7/04* (2013.01); *F17C 13/04* (2013.01); *F17C 2227/0135* (2013.01); (Continued)

(58) Field of Classification Search
CPC .... F17C 7/04; F17C 13/04; F17C 2227/0135; F17C 2227/0339; F17C 2227/0337; B24C 1/003
See application file for complete search history.

(56) References Cited

U.S. PATENT DOCUMENTS 4,995,918 A 2/1991 Grohmann
5,512,106 A 4/1996 Tamai et al.
(Continued)

FOREIGN PATENT DOCUMENTS

CN 1040532 A 3/1990
CN 101010509 A 8/2007
(Continued)

OTHER PUBLICATIONS

EP0592841A1 English machine translation (Year: 1994).*

*Primary Examiner* — Jenna M Maroney
(74) *Attorney, Agent, or Firm* — Volpe Koenig

(57) ABSTRACT

A liquefied fluid supply system is a liquefied fluid supply system of supplying a nozzle with a liquefied fluid that vaporizes after spraying and includes: a supercooler that cools the liquefied fluid to a temperature lower than a saturation temperature thereof and makes the liquefied fluid into a supercooled liquid; and a booster that boosts in pressure the liquefied fluid made into the supercooled liquid by the supercooler and supplies the liquefied fluid to the nozzle.

10 Claims, 3 Drawing Sheets

(52) U.S. Cl.
CPC ................. *F17C 2227/0337* (2013.01); *F17C 2227/0339* (2013.01); *F17C 2250/043* (2013.01); *F17C 2250/0439* (2013.01)

(56) References Cited

U.S. PATENT DOCUMENTS

| | | | | | |
|---|---|---|---|---|---|
| 5,733,174 | A * | 3/1998 | Bingham | B24C 9/003 451/39 |
| 6,564,579 | B1 | 5/2003 | McCartney | |
| 6,581,390 | B2 * | 6/2003 | Emmer | F17C 7/04 62/53.2 |
| 6,640,556 | B2 * | 11/2003 | Ursan | F04B 15/08 62/50.7 |
| 7,140,954 | B2 | 11/2006 | Johnson et al. | |
| 7,310,955 | B2 | 12/2007 | Hume et al. | |
| 7,316,363 | B2 | 1/2008 | Hume et al. | |
| 2006/0049274 | A1 | 3/2006 | Hume et al. | |
| 2006/0053165 | A1 | 3/2006 | Hume et al. | |
| 2010/0172763 | A1 | 7/2010 | Habumuremyi | |
| 2011/0048454 | A1 | 3/2011 | Saeki et al. | |
| 2013/0327421 | A1 | 12/2013 | Chang et al. | |
| 2014/0311591 | A1 | 10/2014 | Drube | |
| 2016/0053943 | A1 | 2/2016 | Kowalewski | |
| 2016/0370036 | A1 | 12/2016 | Herzog et al. | |

FOREIGN PATENT DOCUMENTS

| | | | | | |
|---|---|---|---|---|---|
| CN | 100562683 | C | 11/2009 | |
| CN | 101688457 | A | 3/2010 | |
| CN | 102374708 | A | 3/2012 | |
| CN | 103328877 | A | 9/2013 | |
| CN | 105143753 | A | 12/2015 | |
| CN | 105531526 | A | 4/2016 | |
| EP | 592841 | A1 * | 4/1994 | B23K 7/00 |
| EP | 1784572 | A1 | 5/2007 | |
| JP | 06-295895 | A | 10/1994 | |
| JP | 07-136601 | A | 5/1995 | |
| JP | 2011-189332 | A | 9/2011 | |
| JP | 2016-519263 | A | 6/2016 | |
| KR | 1020080031708 | A * | 4/2008 | |
| KR | 10-2016-0030192 | A | 3/2016 | |
| KR | 10-2016-0128638 | A | 11/2016 | |
| WO | WO-2006028570 | A1 * | 3/2006 | B24C 1/003 |
| WO | WO-2015000708 | A1 * | 1/2015 | F17C 13/007 |
| WO | 2015/095031 | A2 | 6/2015 | |

* cited by examiner

LIQUEFIED FLUID SUPPLY SYSTEM AND LIQUEFIED FLUID-SPRAYING APPARATUS

CROSS REFERENCE TO RELATED APPLICATIONS

This application is a national stage entry according to 35 U.S.C. 371 of International Application No. PCT/JP2019/002898, filed on Jan. 29, 2019, which claims priority to Japanese Patent Application No. 2018-015682, filed Jan. 31, 2018, the contents of which are entirely incorporated herein by reference.

TECHNICAL FIELD

The present disclosure relates to a liquefied fluid supply system and a liquefied fluid-spraying apparatus.

BACKGROUND

For example, Patent Document 1 discloses a method of working or cleaning an object by spraying liquid nitrogen thereonto instead of water. In the water jet method using water, cutting chips and dirt are mixed in water, and therefore it is necessary to consider the treatment of the water, and a large amount of secondary waste may be produced. On the other hand, in a case of using liquid nitrogen that vaporizes after spraying, the liquid nitrogen vaporizes separately from cutting chips and dirt, so that working and cleaning can be performed without producing secondary waste.

DOCUMENT OF RELATED ART

Patent Document

[Patent Document 1] U.S. Pat. No. 7,310,955

SUMMARY

Technical Problem

In Patent Document 1, the liquid nitrogen supplied from a liquid nitrogen supply source is boosted in pressure by a pre-pump and an intensifier pump, and the boosted liquid nitrogen is sprayed from a nozzle. Since the liquid nitrogen is increased in pressure by these pumps so that the temperature of the liquid nitrogen increases, in Patent Document 1, the liquid nitrogen is cooled by a heat exchanger during the boosting process and after boosting.

However, part of the liquid nitrogen vaporizes when it is increased in temperature or during liquid transfer and is released into the atmosphere as nitrogen gas. Therefore, in the method of Patent Document 1, a large amount of liquid nitrogen that is consumed by being discharged into the atmosphere without being sprayed from the nozzle is generated, and the consumption amount of the liquid nitrogen increases unnecessarily.

The present disclosure is made in view of the above-described problems, and an object thereof is to reduce the amount of a liquefied fluid that is consumed without being sprayed from a nozzle in a liquefied fluid supply system and a liquefied fluid-spraying apparatus using the liquefied fluid that vaporizes after spraying.

Solution to Problem

The present disclosure adopts the following configurations as means for solving the above problems.

A liquefied fluid supply system of a first aspect of the present disclosure is a liquefied fluid supply system of supplying a nozzle with a liquefied fluid that vaporizes after spraying, the liquefied fluid supply system including: a supercooler that cools the liquefied fluid to a temperature lower than a saturation temperature thereof and makes the liquefied fluid into a supercooled liquid; and a booster that boosts in pressure the liquefied fluid made into the supercooled liquid by the supercooler and supplies the liquefied fluid to the nozzle.

A liquefied fluid supply system of a second aspect of the present disclosure is that in the first aspect, the supercooler cools the liquefied fluid such that the liquefied fluid has a degree of supercooling such that a temperature of the liquefied fluid does not exceed the saturation temperature during supply to the booster and during boosting by the booster.

A liquefied fluid supply system of a third aspect of the present disclosure is that in the first or second aspect, the supercooler includes a supercooler heat exchanger that cools the liquefied fluid to be supplied to the booster by heat exchange with a cooling liquefied fluid having a temperature lower than that of the liquefied fluid.

A liquefied fluid supply system of a fourth aspect of the present disclosure is that in the third aspect, the supercooler includes a supercooling booster pump that pumps the liquefied fluid to the booster.

A liquefied fluid supply system of a fifth aspect of the present disclosure is that in the fourth aspect, the supercooling booster pump is accommodated in the supercooler heat exchanger.

A liquefied fluid supply system of a sixth aspect of the present disclosure is that in any one of the third to fifth aspects, the supercooler includes: a discharge pipe connected to a storage tank that stores the liquefied fluid; a booster supply pipe that connects the supercooler heat exchanger and the discharge pipe to each other and guides, to the supercooler heat exchanger, the liquefied fluid to be supplied to the booster; a cooling pipe that connects the supercooler heat exchanger and the discharge pipe to each other and guides the liquefied fluid as the cooling liquefied fluid to the supercooler heat exchanger; and a cooling pipe resister provided in an intermediate portion of the cooling pipe and serving as a resistance to the cooling liquefied fluid.

A liquefied fluid supply system of a seventh aspect of the present disclosure is the sixth aspect, including: a post-boosting-cooling heat exchanger that cools the liquefied fluid boosted by the booster; a posterior cooling pipe that connects the post-boosting-cooling heat exchanger and the discharge pipe to each other and guides the liquefied fluid as a posterior cooling liquefied fluid to the post-boosting-cooling heat exchanger; and a posterior cooling pipe resister provided in an intermediate portion of the posterior cooling pipe and serving as a resistance to the posterior cooling liquefied fluid.

A liquefied fluid supply system of an eighth aspect of the present disclosure is that in any one of the third to seventh aspects, the booster includes: a booster pump that boosts the liquefied fluid in pressure; a return pipe that returns part of the liquefied fluid boosted by the booster pump to the supercooler as the cooling liquefied fluid; and a return pipe resister provided in an intermediate portion of the return pipe and serving as a resistance to the liquefied fluid while being returned as the cooling liquefied fluid.

A liquefied fluid supply system of a ninth aspect of the present disclosure is that in the eighth aspect, the booster includes a return flow rate-limiting mechanism, and the return flow rate-limiting mechanism is provided in an intermediate portion of the return pipe and adjusts a flow rate of the liquefied fluid flowing through the return pipe.

A liquefied fluid supply system of a tenth aspect of the present disclosure is that in any one of the first to ninth aspects, the booster includes: a primary booster pump that primarily boosts in pressure the liquefied fluid supplied from the supercooler; and a secondary booster pump that secondarily boosts in pressure the primarily boosted liquefied fluid.

A liquefied fluid supply system of an eleventh aspect of the present disclosure is that in any one of the first to ninth aspects, the booster includes a single-stage booster pump that boosts the liquefied fluid supplied from the supercooler up to a supply pressure to the nozzle at once.

A liquefied fluid-spraying apparatus of a twelfth aspect of the present disclosure includes: a nozzle that sprays a liquefied fluid that vaporizes after spraying; and a liquefied fluid supply system of any one of the first to eleventh aspects, which supplies a liquefied fluid to the nozzle.

Effects

According to the present disclosure, a liquefied fluid before boosting is cooled by the supercooler to a temperature lower than the saturation temperature thereof and is made into a state of a supercooled liquid having a high degree of supercooling. Therefore, it is possible to prevent or limit the liquefied fluid from reaching the saturation temperature or higher during supply to the booster or during the boosting process and to prevent or limit part of the liquefied fluid from vaporizing and being released into the atmosphere. Consequently, according to the present disclosure, in the liquefied fluid supply system and the liquefied fluid-spraying apparatus using the liquefied fluid that vaporizes after spraying, it is possible to reduce the amount of the liquefied fluid that is consumed without being sprayed from the nozzle.

DESCRIPTION OF EMBODIMENTS

Hereinafter, embodiments of a liquefied fluid supply system and a liquefied fluid-spraying apparatus of the present disclosure will be described with reference to the drawings.

First Embodiment

Figure 1:
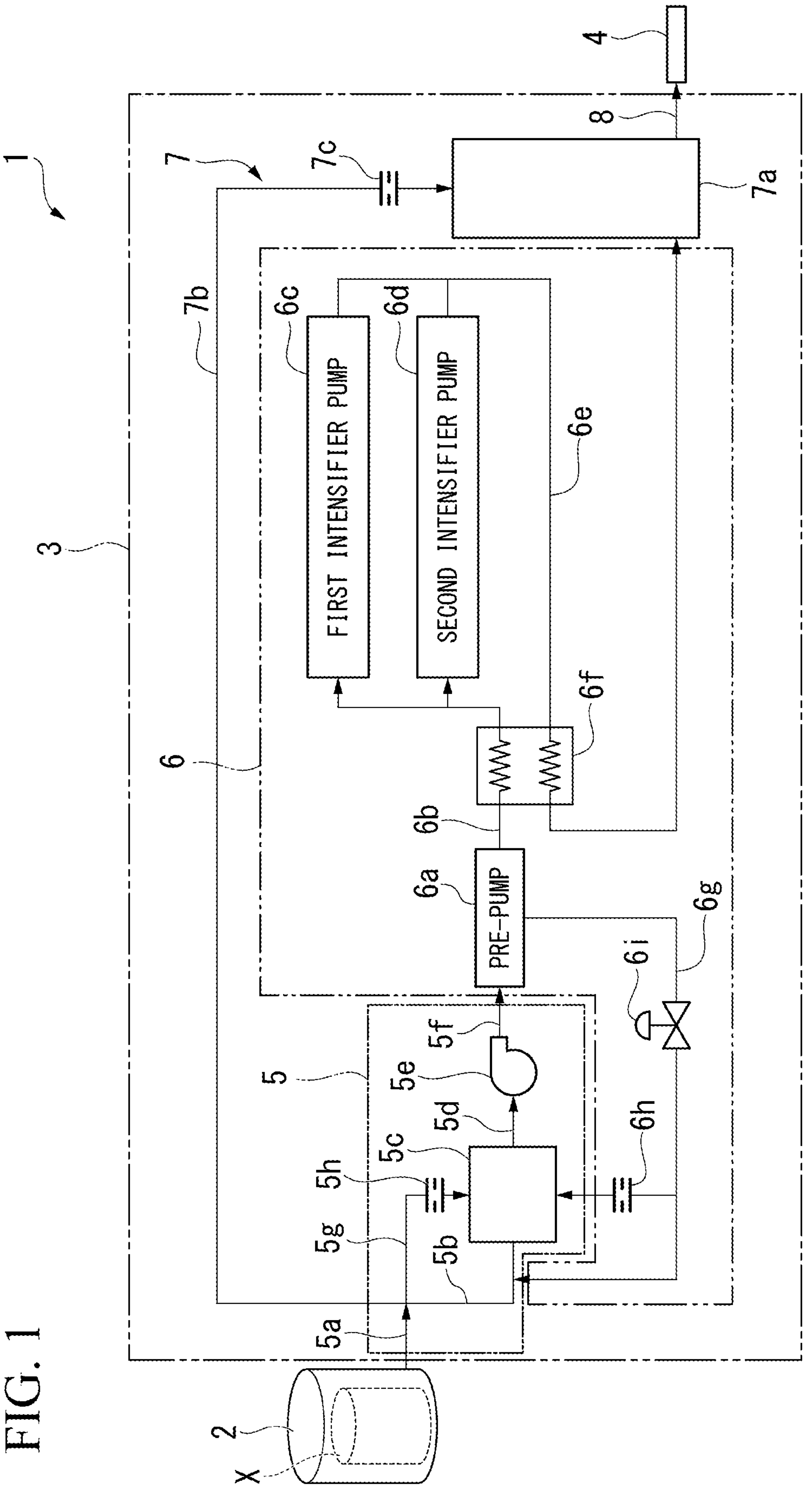
FIG. 1 is a flow diagram showing a schematic configuration of a liquefied fluid-spraying apparatus of a first embodiment of the present disclosure.

FIG. 1 is a flow diagram showing a schematic configuration of a liquefied fluid-spraying apparatus 1 of the first embodiment. As shown in this diagram, the liquefied fluid-spraying apparatus 1 of this embodiment includes a storage tank 2, a liquefied fluid supply system 3, and a nozzle 4.

The storage tank 2 is a pressure tank that stores a liquid nitrogen X (a liquefied fluid) and is connected to the liquefied fluid supply system 3. Note that the liquefied fluid-spraying apparatus 1 of this embodiment may be configured to receive supply of the liquid nitrogen X from the outside without including the storage tank 2. The liquefied fluid supply system 3 boosts in pressure the liquid nitrogen X supplied from the storage tank 2 up to a constant spray pressure. The liquefied fluid supply system 3 is connected to the nozzle 4. The nozzle 4 sprays the liquid nitrogen X supplied from the liquefied fluid supply system 3 from the tip thereof.

The liquefied fluid-spraying apparatus 1 of this embodiment boosts the liquid nitrogen X that vaporizes by being sprayed into the atmosphere by the liquefied fluid supply system 3 and sprays it from the nozzle 4. That is, the liquefied fluid-spraying apparatus 1 includes the nozzle 4 that sprays the liquid nitrogen X that vaporizes after spraying, and the liquefied fluid supply system 3 that supplies the liquid nitrogen X to the nozzle 4.

As shown in FIG. 1, the liquefied fluid supply system 3 includes a supercooler 5, a booster 6, a posterior cooler 7, and a flexible tube 8. The supercooler 5 includes a discharge pipe 5*a*, a booster supply pipe 5*b*, a supercooler heat exchanger 5*c*, a connection pipe 5*d*, a booster pump 5*e* (a supercooling booster pump), a delivery pipe 5*f*, a cooling pipe 5*g*, and a cooling pipe orifice 5*h* (a cooling pipe resister).

The discharge pipe 5*a* is a pipe connected to the storage tank 2 and guides, toward the booster supply pipe 5*b* and the like, the liquid nitrogen X discharged from the storage tank 2. The booster supply pipe 5*b* is a pipe that connects the discharge pipe 5*a* and the supercooler heat exchanger 5*c* to each other and guides the liquid nitrogen X from the discharge pipe 5*a* to the supercooler heat exchanger 5*c*. The booster supply pipe 5*b* guides the liquid nitrogen X to be supplied to the booster 6 of the posterior stage, of the liquid nitrogen X flowing through the discharge pipe 5*a*.

The supercooler heat exchanger 5*c* is a heat exchanger that cools the liquid nitrogen X supplied from the booster supply pipe 5*b* to a temperature lower than the saturation temperature thereof by heat exchange with liquid nitrogen X supplied from the cooling pipe 5*g*. The supercooler heat exchanger 5*c* is, for example, a plate fin type heat exchanger and heat exchanges liquid nitrogen X in a pressurized state discharged from the storage tank 2 and supplied from the booster supply pipe 5*b* with liquid nitrogen X supplied from the cooling pipe 5*g* and having a low pressure and a low temperature. The supercooler heat exchanger 5*c* cools the liquid nitrogen X supplied from the booster supply pipe 5*b* to a temperature lower than the saturation temperature thereof and thereby makes the liquid nitrogen X into a supercooled liquid. In this stage, the supercooler heat exchanger 5*c* cools the liquid nitrogen X such that the liquid nitrogen X has a degree of supercooling such that the temperature of the liquid nitrogen X does not exceed the saturation temperature during supply to the booster 6 of the posterior stage and during boosting by the booster 6.

The connection pipe 5*d* is a pipe that connects the supercooler heat exchanger 5*c* and the booster pump 5*e* to each other and guides, from the supercooler heat exchanger 5*c* to the booster pump 5*e*, the liquid nitrogen X made into the supercooled liquid by the supercooler heat exchanger 5*c*. The booster pump 5*e* is a pump that boosts in pressure the liquid nitrogen X supplied through the connection pipe 5*d* and pumps the liquid nitrogen X toward the booster 6 through the delivery pipe 5*f*. For the booster pump 5*e*, for example, a centrifugal pump is used. The delivery pipe 5*f* is a pipe that connects the booster pump 5*e* and the booster 6 to each other and guides the liquid nitrogen X from the booster pump 5*e* to the booster 6.

The cooling pipe 5*g* is a pipe that connects the discharge pipe 5*a* and the supercooler heat exchanger 5*c* to each other and guides the liquid nitrogen X from the discharge pipe 5*a* to the supercooler heat exchanger 5*c*. The cooling pipe 5*g* guides the liquid nitrogen X to be used as cooling liquid nitrogen (a cooling liquefied fluid) at the supercooler heat exchanger 5*c*, of the liquid nitrogen X flowing through the discharge pipe 5*a*. Note that the cooling liquid nitrogen here denotes the liquid nitrogen X to be used to cool liquid nitrogen X (liquid nitrogen X to be supplied to the booster 6 as the supercooled liquid) that is a cooling target of the supercooler heat exchanger 5*c*.

The cooling pipe orifice 5*h* is a resister provided in an intermediate portion of the cooling pipe 5*g* and serves as a resistance to the flow of the liquid nitrogen X. The cooling pipe orifice 5*h* is a restricted flow path for maintaining the pressure at a portion of the cooling pipe 5*g* further upstream than the cooling pipe orifice 5*h*. The liquid nitrogen X supplied to the supercooler heat exchanger 5*c* as the cooling liquid nitrogen is decreased in pressure at the supercooler heat exchanger 5*c*. The cooling pipe orifice 5*h* prevents the upstream side of the cooling pipe 5*g* from being decreased in pressure according to the pressure inside the supercooler heat exchanger 5*c* and in addition, limits the liquid nitrogen X from being decreased in pressure in the discharge pipe 5*a* and the booster supply pipe 5*b*, and the pressure of the liquid nitrogen X in the discharge pipe 5*a* and the booster supply pipe 5*b* is maintained.

The supercooler 5 cools part of the liquid nitrogen X supplied from the storage tank 2 so as to make it into the supercooled liquid having a temperature lower than the saturation temperature and supplies the liquid nitrogen X made into the supercooled liquid to the booster 6.

The booster 6 includes a pre-pump 6*a* (a primary booster pump), a connection pipe 6*b*, a first intensifier pump 6*c* (a secondary booster pump), a second intensifier pump 6*d* (a secondary booster pump), a delivery pipe 6*e*, a booster heat exchanger 6*f*, a return pipe 6*g*, a return pipe orifice 6*h* (a return pipe resister), and a return flow rate-limiting valve 6*i*.

The pre-pump 6*a* is a pump connected to the delivery pipe 5*f* of the supercooler 5 and is supplied with the liquid nitrogen X cooled to a temperature lower than the saturation temperature by the supercooler 5. The pre-pump 6*a* is, for example, a piston pump and primarily boosts in pressure the liquid nitrogen X supplied from the supercooler 5. The connection pipe 6*b* is a pipe that connects the pre-pump 6*a* to the first intensifier pump 6*c* and the second intensifier pump 6*d*. The end of the connection pipe 6*b* close to the first intensifier pump 6*c* and the second intensifier pump 6*d* branches into two, one of the two is connected to the first intensifier pump 6*c*, and the other thereof is connected to the second intensifier pump 6*d*. In addition, the region of an intermediate portion of the connection pipe 6*b*, which does not branch, passes through the booster heat exchanger 6*f* The connection pipe 6*b* guides the liquid nitrogen X boosted by the pre-pump 6*a* from the pre-pump 6*a* to the first intensifier pump 6*c* or the second intensifier pump 6*d*.

The first intensifier pump 6*c* and the second intensifier pump 6*d* are pumps connected in parallel to the connection pipe 6*b* and are supplied with the liquid nitrogen X boosted by the pre-pump 6*a* through the connection pipe 6*b*. The first intensifier pump 6*c* and the second intensifier pump 6*d* are, for example, piston pumps and secondarily boost the liquid nitrogen X that has been primarily boosted by the pre-pump 6*a*. As described above, the booster 6 includes a plurality of intensifier pumps (the first intensifier pump 6*c* and the second intensifier pump 6*d*) that are connected in parallel and are configured to be multistage.

The delivery pipe 6*e* is a pipe that connects the first intensifier pump 6*c* and the second intensifier pump 6*d* to the posterior cooler 7 and guides the liquid nitrogen X secondarily boosted by the first intensifier pump 6*c* or the second intensifier pump 6*d* to the posterior cooler 7. The end of the delivery pipe 6*e* close to the first intensifier pump 6*c* and the second intensifier pump 6*d* branches into two, one of the two is connected to the first intensifier pump 6*c*, and the other thereof is connected to the second intensifier pump 6*d*. In addition, the region of an intermediate portion of the delivery pipe 6*e*, which does not branch, passes through the booster heat exchanger 6*f*.

The booster heat exchanger 6*f* is a heat exchanger through which the intermediate portion of the connection pipe 6*b* and the intermediate portion of the delivery pipe 6*e* pass as described above and heat exchanges liquid nitrogen X flowing through the connection pipe 6*b* with liquid nitrogen X flowing through the delivery pipe 6*e*. The liquid nitrogen X flowing through the delivery pipe 6*e* is increased in temperature by being boosted by the first intensifier pump 6*c* or the second intensifier pump 6*d*. Therefore, in the booster heat exchanger 6*f*, the liquid nitrogen X flowing through the connection pipe 6*b* is increased in temperature by heat exchange, and the liquid nitrogen X flowing through the delivery pipe 6*e* is decreased in temperature by the heat exchange. Note that, for example, when the heat resistance temperature of the low temperature side of the first intensifier pump 6*c* and the second intensifier pump 6*d* is sufficiently low, and the cooling performance of the posterior cooler 7 of the posterior stage is sufficiently high, it is possible to omit the booster heat exchanger 6*f* That is, in a case where the internal components of the first intensifier pump 6*c* and the second intensifier pump 6*d* can withstand the temperature of the liquid nitrogen X primarily boosted by the pre-pump 6*a*, and only the posterior cooler 7 can cool the liquid nitrogen X secondarily boosted by the first intensifier pump 6*c* and the second intensifier pump 6*d* to a spray temperature at the nozzle 4, it is possible to adopt a configuration without the booster heat exchanger 6*f*.

The return pipe 6*g* is a pipe that connects the pre-pump 6*a* and the supercooler 5 to each other and returns part of the liquid nitrogen X boosted by the pre-pump 6*a* (a booster pump) to the supercooler 5. The end of the return pipe 6*g* close to the supercooler 5 branches into two, one of the two is connected to the booster supply pipe 5*b* of the supercooler 5, and the other thereof is connected to the supercooler heat exchanger 5*c* of the supercooler 5. The return pipe 6*g* joins part of the liquid nitrogen X boosted by the pre-pump 6*a* to the booster supply pipe 5*b* of the supercooler 5 to circulate it and returns the rest of the liquid nitrogen X boosted by the pre-pump 6*a* to the supercooler heat exchanger 5*c* of the supercooler 5 as the cooling liquid nitrogen.

The return pipe orifice 6*h* is a resister provided in an intermediate part of a portion, the portion being connected to the supercooler heat exchanger 5*c* of the supercooler 5, and serves as a resistance to the flow of the liquid nitrogen X. The return pipe orifice 6*h* is a restricted flow path for maintaining the pressure at a portion of the return pipe 6*g* further upstream than the return pipe orifice 6*h*. The liquid nitrogen X supplied to the supercooler heat exchanger 5*c* as the cooling liquid nitrogen is decreased in pressure at the supercooler heat exchanger 5*c*. The return pipe orifice 6*h* prevents the upstream side of the return pipe 6*g* from being decreased in pressure according to the pressure inside the supercooler heat exchanger 5*c* and in addition, limits the liquid nitrogen X from being decreased in pressure in the pre-pump 6*a*, and the pressure of the liquid nitrogen X in the pre-pump 6*a* is maintained.

The return flow rate-limiting valve 6*i* (a return flow rate-limiting mechanism) is provided in an intermediate portion of the return pipe 6*g* further upstream than the return pipe orifice 6*h*. The return flow rate-limiting valve 6*i* is a flow rate control valve that adjusts the flow rate of the liquid nitrogen X that flows through the return pipe 6*g* and is returned to the supercooler 5. The return flow rate-limiting valve 6*i* can adjust the flow rate of the liquid nitrogen X that is returned from the pre-pump 6*a* through the return pipe 6*g* to the supercooler 5, and it is possible to limit an excess amount of the liquid nitrogen X from being returned from the pre-pump 6*a* to the supercooler 5. In addition, it is also possible to provide a return flow rate-limiting mechanism including an open-close valve and an orifice, instead of the return flow rate-limiting valve 6*i*.

The posterior cooler 7 includes a post-boosting-cooling heat exchanger 7*a*, a posterior cooling pipe 7*b*, and a posterior cooling pipe orifice 7*c*. The post-boosting-cooling heat exchanger 7*a* is a heat exchanger that cools the boosted liquid nitrogen X supplied from the booster 6 to the spray temperature by heat exchange with liquid nitrogen X supplied from the posterior cooling pipe 7*b*. The post-boosting-cooling heat exchanger 7*a* is, for example, a shell-and-tube type heat exchanger and heat exchanges the liquid nitrogen X in a pressurized state boosted by the booster 6 with the liquid nitrogen X supplied from the posterior cooling pipe 7*b* and having a low pressure and a low temperature.

The posterior cooling pipe 7*b* connects the discharge pipe 5*a* of the supercooler 5 and the post-boosting-cooling heat exchanger 7*a* to each other and guides the liquid nitrogen X from the discharge pipe 5*a* to the post-boosting-cooling heat exchanger 7*a*. The posterior cooling pipe 7*b* guides the liquid nitrogen X to be used as the cooling liquid nitrogen (a posterior cooling liquefied fluid) in the post-boosting-cooling heat exchanger 7*a*, of the liquid nitrogen X flowing through the discharge pipe 5*a*. Note that the cooling liquid nitrogen here denotes the liquid nitrogen X to be used to cool liquid nitrogen X (liquid nitrogen X to be sprayed from the nozzle 4) that is a cooling target of the post-boosting-cooling heat exchanger 7*a*.

The posterior cooling pipe orifice 7*c* is a resister provided in an intermediate portion of the posterior cooling pipe 7*b* and serves as a resistance to the flow of the liquid nitrogen X. The posterior cooling pipe orifice 7*c* is a restricted flow path for locating maintaining the pressure at a portion of the posterior cooling pipe 7*b* further upstream than the posterior cooling pipe orifice 7*c*. The liquid nitrogen X supplied to the post-boosting-cooling heat exchanger 7*a* as the cooling liquid nitrogen is decreased in pressure at the post-boosting-cooling heat exchanger 7*a*. The posterior cooling pipe orifice 7*c* prevents the upstream side of the posterior cooling pipe 7*b* from being decreased in pressure according to the pressure inside the post-boosting-cooling heat exchanger 7*a* and in addition, limits the liquid nitrogen X from being decreased in pressure in the discharge pipe 5*a* and the booster supply pipe 5*b*, and the pressure of the liquid nitrogen X in the discharge pipe 5*a* and the booster supply pipe 5*b* is maintained.

The flexible tube 8 is a steel pipe that connects the posterior cooler 7 and the nozzle 4 to each other and connects the nozzle 4 to the posterior cooler 7 such that an operator can easily change the attitude of the nozzle 4. The posterior cooler 7 is connected to the nozzle 4 through the flexible tube 8, cools the liquid nitrogen X after boosting and supplies the liquid nitrogen X to the nozzle 4.

In the liquefied fluid-spraying apparatus 1 having the above configuration of this embodiment, the liquid nitrogen X stored in the storage tank 2 is supplied to the supercooler 5. The liquid nitrogen X supplied to the supercooler 5 is guided by the discharge pipe 5*a* and thereafter is distributed to the booster supply pipe 5*b*, the cooling pipe 5*g*, and the posterior cooling pipe 7*b*. The liquid nitrogen X supplied to the booster supply pipe 5*b* is supplied to the supercooler heat exchanger 5*c* in a pressurized state and is cooled by heat exchange with liquid nitrogen X supplied to the supercooler heat exchanger 5*c* through the cooling pipe 5*g* and decreased in pressure, thereby being made into the supercooled liquid. The liquid nitrogen X that has been made into the supercooled liquid by the supercooler heat exchanger 5*c* is pumped toward the booster 6 through the delivery pipe 5*f* by the booster pump 5*e*.

The liquid nitrogen X supplied to the booster 6 in a state of the supercooled liquid is primarily boosted by the pre-pump 6*a*. Part of the liquid nitrogen X boosted by the pre-pump 6*a* is supplied to the first intensifier pump 6*c* or the second intensifier pump 6*d* through the connection pipe 6*b*. The rest of the liquid nitrogen X boosted by the pre-pump 6*a* is returned through the return pip 6*g* to the booster supply pipe 5*b* or the supercooler heat exchanger 5*c* of the supercooler 5.

The liquid nitrogen X flowing through the connection pipe 6*b* is heated by the booster heat exchanger 6*f* and thereafter is secondarily boosted by the first intensifier pump 6*c* or the second intensifier pump 6*d*. The secondarily boosted liquid nitrogen X is supplied to the posterior cooler 7 through the delivery pipe 6*e*. At this time, the liquid nitrogen X flowing through the delivery pipe 6*e* is decreased in temperature by the booster heat exchanger 6*f*.

The liquid nitrogen X supplied to the posterior cooler 7 is cooled at the post-boosting-cooling heat exchanger 7*a* to the spray temperature by heat exchange with liquid nitrogen X supplied to the post-boosting-cooling heat exchanger 7*a* through the posterior cooling pipe 7*b* and decreased in pressure. The liquid nitrogen X cooled by the posterior cooler 7 is supplied to the nozzle 4 through the flexible tube 8 and is sprayed from the nozzle 4.

According to the liquefied fluid-spraying apparatus 1 and the liquefied fluid supply system 3 of this embodiment as described above, the liquid nitrogen X before boosting is cooled by the supercooler 5 to a temperature lower than the saturation temperature thereof to be made into a state of the supercooled liquid having a high degree of supercooling. Therefore, it is possible to prevent or limit the liquid nitrogen X from reaching the saturation temperature or higher during supply to the booster 6 or during the boosting process and to prevent or limit part of the liquid nitrogen X from vaporizing and being released into the atmosphere. Consequently, according to the liquefied fluid-spraying apparatus 1 and the liquefied fluid supply system 3, it is possible to reduce the amount of the liquid nitrogen X that is consumed without being sprayed from the nozzle 4.

In the liquefied fluid supply system 3, the supercooler 5 cools the liquid nitrogen X to be sprayed such that the liquid nitrogen X has a degree of supercooling such that the temperature of the liquid nitrogen X does not exceed the saturation temperature during supply to the booster 6 and during boosting by the booster 6. Therefore, according to the liquefied fluid supply system 3, it is possible to further reduce the liquid nitrogen X vaporizing at the booster 6 and to further reduce the amount of the liquid nitrogen X that is consumed without being sprayed from the nozzle 4.

In the liquefied fluid supply system 3, the supercooler 5 includes the supercooler heat exchanger 5*c* that cools the liquid nitrogen X to be supplied to the booster 6 by heat exchange with the cooling liquefied fluid (liquid nitrogen X supplied from the cooling pipe 5*g*) having a lower temperature than that of the former liquid nitrogen X. Therefore, according to the liquefied fluid supply system 3, it is possible to make the liquid nitrogen X to be supplied to the booster 6 into a state of the supercooled liquid using a simple configuration.

In the liquefied fluid supply system 3, the supercooler 5 includes the booster pump 5*e* that pumps the liquid nitrogen X to the booster 6. Therefore, even if the pressure of the liquid nitrogen X drops during the cooling process in the supercooler 5, the booster pump 5*e* can reliably supply the liquid nitrogen X to the booster 6. Note that, if the pressure of the liquid nitrogen X discharged from the storage tank 2 can be kept suitably high for supplying the liquid nitrogen X to the booster 6, it is possible to omit the booster pump 5*e*.

In the liquefied fluid supply system 3, the supercooler 5 includes: the discharge pipe 5*a* connected to the storage tank 2 that stores the liquid nitrogen X; the booster supply pipe 5*b* that connects the supercooler heat exchanger 5*c* and the discharge pipe 5*a* to each other and guides, to the supercooler heat exchanger 5*c*, the liquid nitrogen X to be supplied to the booster 6; the cooling pipe 5*g* that connects the supercooler heat exchanger 5*c* and the discharge pipe 5*a* to each other and guides the liquid nitrogen X to the supercooler heat exchanger 5*c* as the cooling liquid nitrogen; and the cooling pipe orifice 5*h* that is provided in an intermediate portion of the cooling pipe 5*g* and serves as a resistance to the cooling liquid nitrogen. Therefore, the cooling pipe orifice 5*h* prevents the upstream side of the cooling pipe 5*g* from being decreased in pressure according to the pressure inside the supercooler heat exchanger 5*c* and in addition, limits the liquid nitrogen X from being decreased in pressure in the discharge pipe 5*a* and the booster supply pipe 5*b*, and the pressure of the liquid nitrogen X in the discharge pipe 5*a* and the booster supply pipe 5*b* is maintained. The pressure of the liquid nitrogen X in the discharge pipe 5*a* and the booster supply pipe 5*b* is maintained in this way, whereby the cold heat quantity needed to make the liquid nitrogen X into the supercooled liquid in the supercooler heat exchanger 5*c* can be reduced. As a result, it is possible to decrease the flow rate of the liquid nitrogen X to be supplied to the supercooler heat exchanger 5*c* through the cooling pipe 5*g* and to further reduce the amount of the liquid nitrogen X that is consumed without being sprayed from the nozzle 4.

The liquefied fluid supply system 3 includes: the post-boosting-cooling heat exchanger 7*a* that cools the liquid nitrogen X boosted by the booster 6; the posterior cooling pipe 7*b* that connects the post-boosting-cooling heat exchanger 7*a* and the discharge pipe 5*a* to each other and guides the liquid nitrogen X to the post-boosting-cooling heat exchanger 7*a* as posterior cooling liquid nitrogen; and the posterior cooling pipe orifice 7*c* that is provided in an intermediate portion of the posterior cooling pipe 7*b* and serves as a resistance to the posterior cooling liquid nitrogen. The posterior cooling pipe orifice 7*c* prevents the upstream side of the posterior cooling pipe 7*b* from being decreased in pressure according to the pressure inside the post-boosting-cooling heat exchanger 7*a* and in addition, limits the liquid nitrogen X from being decreased in pressure in the discharge pipe 5*a* and the booster supply pipe 5*b*, and the pressure of the liquid nitrogen X in the discharge pipe 5*a* and the booster supply pipe 5*b* is maintained. The pressure of the liquid nitrogen X in the discharge pipe 5*a* and the booster supply pipe 5*b* is maintained in this way, whereby the cold heat quantity needed to make the liquid nitrogen X into the supercooled liquid in the supercooler heat exchanger 5*c* can be reduced. As a result, it is possible to decrease the flow rate of the liquid nitrogen X to be supplied to the post-boosting-cooling heat exchanger 7*a* through the posterior cooling pipe 7*b* and to further reduce the amount of the liquid nitrogen X that is consumed without being sprayed from the nozzle 4.

In the liquefied fluid supply system 3, the booster 6 includes: the pre-pump 6*a* that boosts the liquid nitrogen X in pressure; the return pipe 6*g* that returns part of the liquid nitrogen X boosted by the pre-pump 6*a* to the supercooler 5 as the cooling liquid nitrogen; and the return pipe orifice 6*h* that is provided in an intermediate portion of the return pipe 6*g* and serves as a resistance to the liquid nitrogen X while being returned as the cooling liquid nitrogen. The return pipe orifice 6*h* prevents the upstream side of the return pipe 6*g* from being decreased in pressure according to the pressure inside the supercooler heat exchanger 5*c* and in addition, limits the liquid nitrogen X from being decreased in pressure in the pre-pump 6*a*, and the pressure of the liquid nitrogen X in the pre-pump 6*a* can be maintained. Furthermore, since the degree of supercooling of the liquid nitrogen X can be maintained, it is possible to decrease the flow rate of the liquid nitrogen X to be supplied to the post-boosting-cooling heat exchanger 7*a* through the posterior cooling pipe 7*b* and to further reduce the amount of the liquid nitrogen X that is consumed without being sprayed from the nozzle 4.

The liquefied fluid supply system 3 includes the return flow rate-limiting valve 6*i* that is provided in an intermediate portion of the return pipe 6*g* and that can adjust the flow rate of the liquid nitrogen X flowing through the return pipe 6*g*. Therefore, it is possible to limit an excess amount of the liquid nitrogen X from being returned from the pre-pump 6*a* to the supercooler 5 and to reduce the flow rate of the liquid nitrogen X flowing through the booster supply pipe 5*b*. Consequently, it is possible to decrease the flow rate of the liquid nitrogen X to be supplied to the supercooler heat exchanger 5*c* through the cooling pipe 5*g* according to a decrease in the flow rate of the liquid nitrogen X in the booster supply pipe 5*b* and to further reduce the amount of the liquid nitrogen X that is consumed without being sprayed from the nozzle 4.

In the liquefied fluid supply system 3, the booster 6 includes: the pre-pump 6*a* that primarily boosts in pressure the liquid nitrogen X supplied from the supercooler 5; and the first intensifier pump 6*c* and the second intensifier pump 6*d* that secondarily boost in pressure the primarily boosted liquid nitrogen X. Therefore, it is possible to reduce the load of the first intensifier pump 6*c* and the second intensifier pump 6*d* as compared to a case where the liquid nitrogen X is boosted only by the first intensifier pump 6*c* and the second intensifier pump 6*d*.

Note that the two intensifier pumps 6*c* and 6*d* are provided in this embodiment, but the present disclosure is not limited to this configuration, and one or three or more intensifier pumps may be provided. That is, the number of the secondary booster pumps of the present disclosure may be one or three or more.

Second Embodiment

Next, a second embodiment of the present disclosure will be described with reference to FIG. 2. Note that when the second embodiment is described, the descriptions of the second embodiment equivalent to those of the first embodiment may be omitted or simplified.

Figure 2:
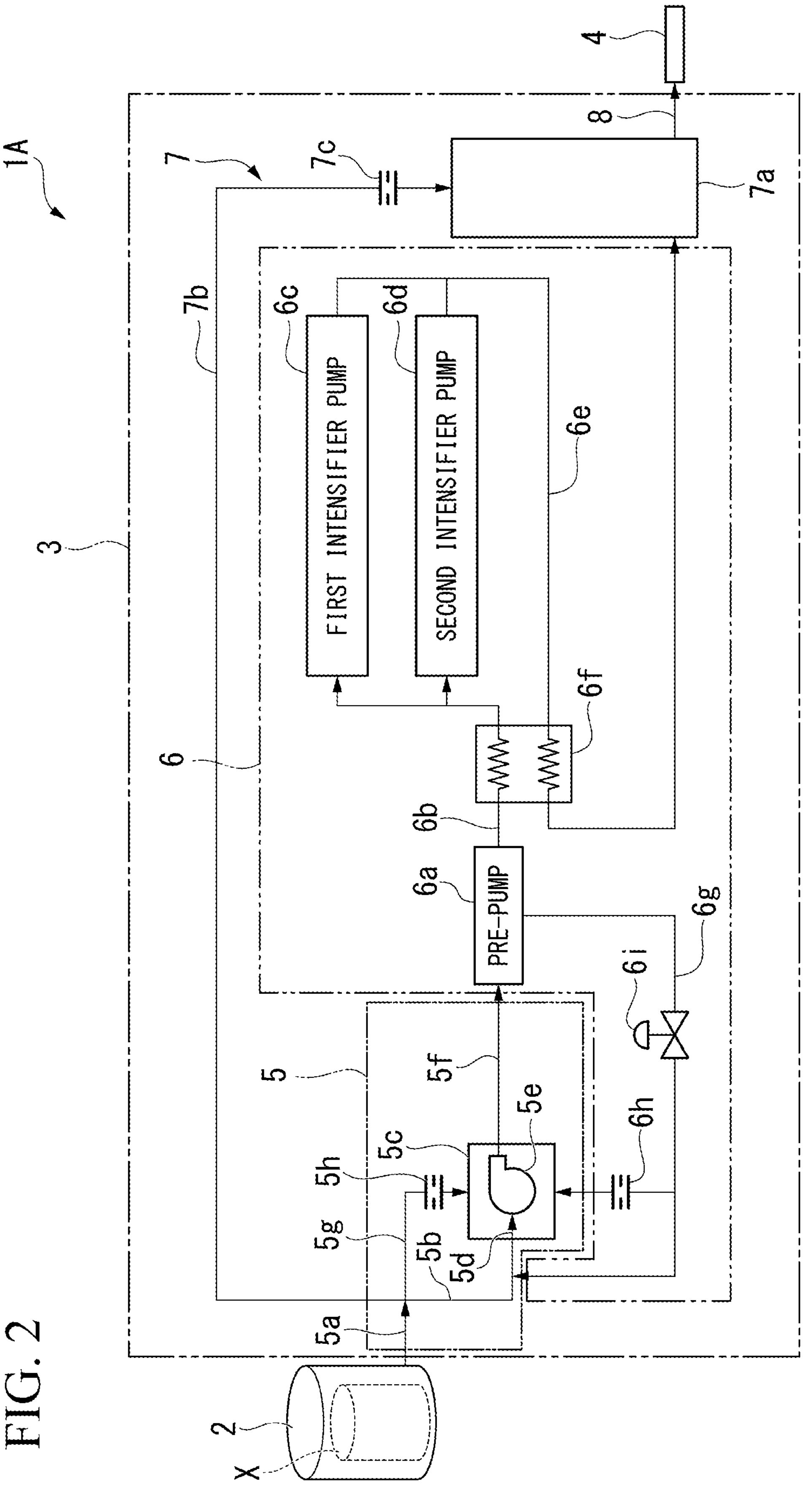
FIG. 2 is a flow diagram showing a schematic configuration of a liquefied fluid-spraying apparatus of a second embodiment of the present disclosure.

FIG. 2 is a flow diagram showing a schematic configuration of a liquefied fluid-spraying apparatus 1A of the second embodiment. As shown in this diagram, in a liquefied fluid supply system 3 of the liquefied fluid-spraying apparatus 1A of this embodiment, the booster pump 5*e* is accommodated in the supercooler heat exchanger 5*c*. In addition, the supercooler 5 is not provided with the connection pipe 5*d*, and the booster supply pipe 5*b* is directly connected to the booster pump 5*e*.

According to the liquefied fluid supply system 3 having the above configuration, it is possible to limit the liquid nitrogen X to be supplied to the booster 6 from increasing in temperature in the booster pump 5*e* and to supply the liquid nitrogen X to the booster 6 in a state where the degree of supercooling of the liquid nitrogen X has been further increased. Therefore, it is possible to prevent the liquid nitrogen X from vaporizing in the booster 6 and to further reduce the amount of the liquid nitrogen X that is consumed without being sprayed from the nozzle 4.

Furthermore, according to the liquefied fluid supply system 3, it is possible to reduce the size thereof because the connection pipe 5*d* does not have to be provided, and it is possible to more reliably limit heat from being input to the liquid nitrogen X from the outside. Therefore, it is possible to further reduce the amount of the liquid nitrogen X that is consumed without being sprayed from the nozzle 4.

Third Embodiment

Next, a third embodiment of the present disclosure will be described with reference to FIG. 3. Note that when the third embodiment is described, the descriptions of the third embodiment equivalent to those of the first embodiment may be omitted or simplified.

Figure 3:
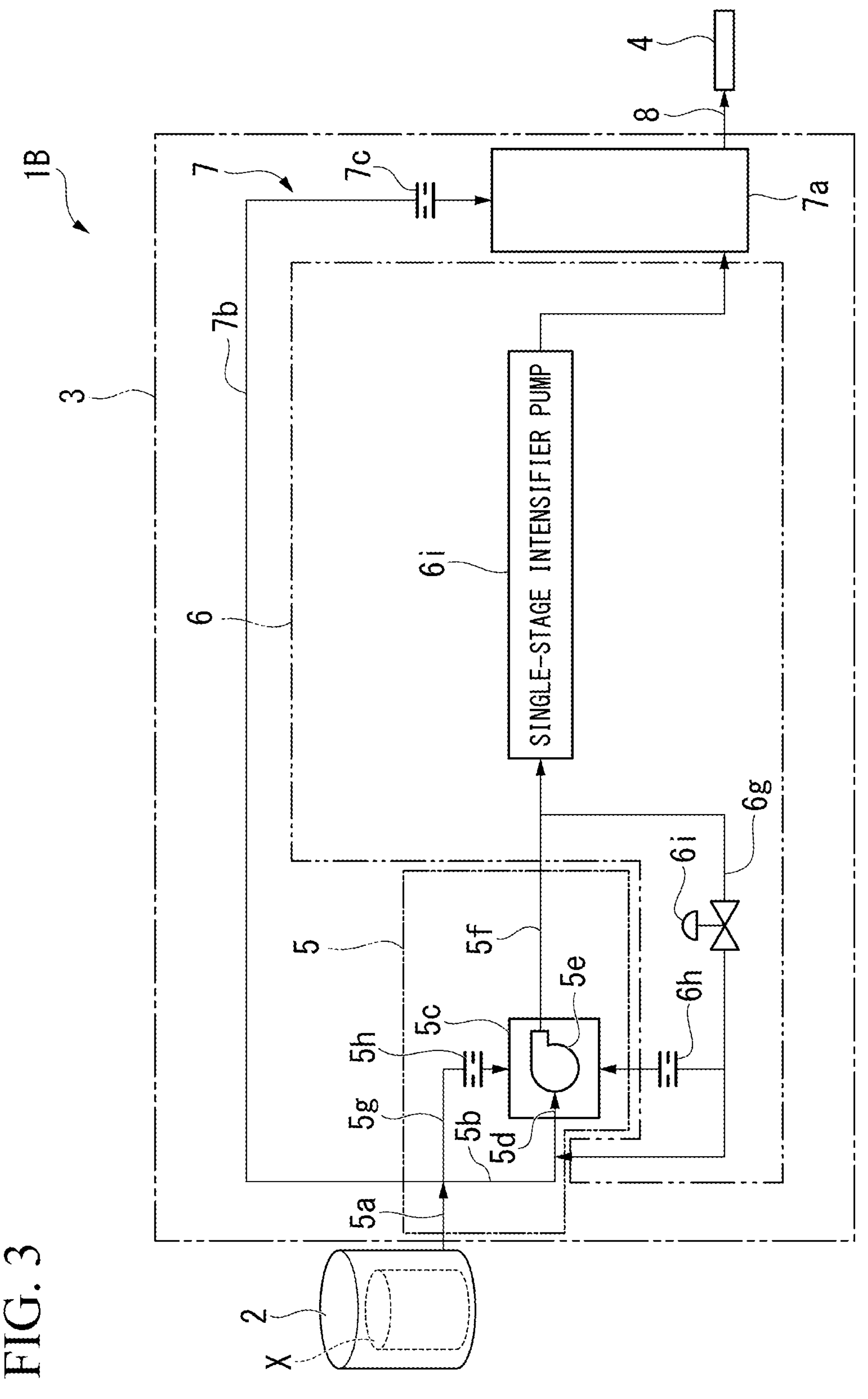
FIG. 3 is a flow diagram showing a schematic configuration of a liquefied fluid-spraying apparatus of a third embodiment of the present disclosure.

FIG. 3 is a flow diagram showing a schematic configuration of a liquefied fluid-spraying apparatus 1B of the third embodiment. As shown in this diagram, in a liquefied fluid supply system 3 of the liquefied fluid-spraying apparatus 1A 1B of this embodiment, the booster pump 5*e* is accommodated in the supercooler heat exchanger 5*c*. In addition, the supercooler 5 is not provided with the connection pipe 5*d*, and the booster supply pipe 5*b* is directly connected to the booster pump 5*e*.

Furthermore, the booster 6 does not include the booster heat exchanger 6*f*, the first intensifier pump 6*c* and the second intensifier pump 6*d* but includes only a single-stage intensifier pump 6*i* 6*j* (a single-stage booster pump) that boosts in pressure the liquid nitrogen X supplied from the supercooler 5 to a supply pressure to the nozzle 4 at once.

In the liquefied fluid supply system 3 having the above configuration, similar to the second embodiment, it is possible to limit the liquid nitrogen X to be supplied to the booster 6 from increasing in temperature in the booster pump 5*e* and to supply the liquid nitrogen X to the booster 6 in a state where the degree of supercooling of the liquid nitrogen X has been further increased. Therefore, it is possible to more reliably prevent the liquid nitrogen X from vaporizing in the booster 6 and to further reduce the amount of the liquid nitrogen X that is consumed without being sprayed from the nozzle 4.

Furthermore, according to the liquefied fluid supply system 3, the connection pipe 5*d*, the first intensifier pump 6*c* and the second intensifier pump 6*d* are not provided, but only one single-stage intensifier pump 6*j* is provided. Therefore, it is possible to reduce the size of the system and to more reliably limit heat from being input to the liquid nitrogen X from the outside. Consequently, it is possible to further reduce the amount of the liquid nitrogen X that is consumed without being sprayed from the nozzle 4.

Hereinbefore, the embodiments of the present disclosure have been described with reference to the attached drawings, but the present disclosure is not limited to the above embodiments. The shapes, combinations, and the like of the components shown in the above embodiments are examples, and various modifications can be adopted based on design requirements and the like within the scope of the present disclosure.

For example, in the above embodiments, the configuration in which the liquid nitrogen is used as a liquefied fluid to be sprayed has been described. However, the present disclosure is not limited to this. For example, it is possible to use liquid carbon dioxide or liquid helium as the liquefied fluid.

In the above embodiments, the configuration in which an orifice is used for the cooling pipe resister, the posterior cooling pipe resister, and the return pipe resister has been described. However, the present disclosure is not limited to this, and it is possible to adopt a configuration in which a throttle valve or the like is used for the cooling pipe resister, the posterior cooling pipe resister, and the return pipe resister and the throttle amount is variable.

In the first and second embodiments, the configuration including the booster heat exchanger 6*f* has been described. For example, in the present disclosure, it is possible to provide a heater in the booster heat exchanger 6*f* or separately therefrom and to heat the liquid nitrogen X flowing through the connection pipe 6*b* to a higher temperature. In such a case, since the temperature of the liquid nitrogen X to be supplied to the first intensifier pump 6*c* and the second intensifier pump 6*d* becomes high, the heat resistance requirement on the low temperature side of a seal ring or the like provided in the first intensifier pump 6*c* and the second intensifier pump 6*d* can be moderated. However, it is of course possible to adopt a configuration in which no heater is provided or neither a heater nor the booster heat exchanger 6*f* is provided. Therefore, the temperature of the liquid nitrogen X flowing through the connection pipe 6*b* can be maintained to be low, whereby it is possible to reduce the consumption amount of the liquid nitrogen X for cooling needed in the post-boosting-cooling heat exchanger 7*a*.

INDUSTRIAL APPLICABILITY

The present disclosure can be applied to a liquefied fluid supply system and a liquefied fluid-spraying apparatus using a liquefied fluid that vaporizes after spraying.

The invention claimed is:

1. A liquefied fluid supply system of supplying a nozzle with a liquefied fluid that vaporizes after spraying, the liquefied fluid supply system comprising:

a supercooler that cools the liquefied fluid to a temperature lower than a saturation temperature thereof and makes the liquefied fluid into a supercooled liquid; and a booster that boosts in pressure the liquefied fluid made into the supercooled liquid by the supercooler and supplies the liquefied fluid to the nozzle, wherein the supercooler includes a supercooler heat exchanger that cools the liquefied fluid to be supplied to the booster by heat exchange with a cooling liquefied fluid having a temperature lower than that of the liquefied fluid, a discharge pipe connected to a storage tank that stores the liquefied fluid, a booster supply pipe that connects the supercooler heat exchanger and the discharge pipe to each other and guides, to the supercooler heat exchanger, the liquefied fluid to be supplied to the booster, a cooling pipe that connects the supercooler heat exchanger and the discharge pipe to each other and guides the liquefied fluid as the cooling liquefied fluid from the discharge pipe to the supercooler heat exchanger, and a cooling pipe orifice provided in an intermediate portion of the cooling pipe that provides resistance to the flow of the cooling liquefied fluid.

2. The liquefied fluid supply system according to claim 1, wherein the supercooler cools the liquefied fluid such that the liquefied fluid has a degree of supercooling that a temperature of the liquefied fluid does not exceed the saturation temperature during supply to the booster and during boosting by the booster.

3. The liquefied fluid supply system according to claim 1, wherein the supercooler includes a supercooling booster pump that pumps the liquefied fluid to the booster.

4. The liquefied fluid supply system according to claim 3, wherein the supercooling booster pump is accommodated in the supercooler heat exchanger.

5. The liquefied fluid supply system according to claim 1, comprising:

a post-boosting-cooling heat exchanger that cools the liquefied fluid boosted by the booster;

a posterior cooling pipe that connects the post-boosting-cooling heat exchanger and the discharge pipe to each other and guides the liquefied fluid as a posterior cooling liquefied fluid to the post-boosting-cooling heat exchanger; and a posterior cooling pipe resister provided in an intermediate portion of the posterior cooling pipe and serving as a resistance to the posterior cooling liquefied fluid.

6. The liquefied fluid supply system according to claim 1, wherein the booster includes:

a booster pump that boosts the liquefied fluid in pressure, a return pipe that returns part of the liquefied fluid boosted by the booster pump to the supercooler as the cooling liquefied fluid, and a return pipe resister provided in an intermediate portion of the return pipe and serving as a resistance to the liquefied fluid during being returned as the cooling liquefied fluid.

7. The liquefied fluid supply system according to claim 6, wherein the booster includes a return flow rate-limiting mechanism, and the return flow rate-limiting mechanism is provided in an intermediate portion of the return pipe and adjusts a flow rate of the liquefied fluid flowing through the return pipe, and wherein the return flow rate-limiting mechanism includes a return flow rate-limiting valve, or an open-close valve and an orifice.

8. The liquefied fluid supply system according to claim 1, wherein the booster includes:

a primary booster pump that primarily boosts in pressure the liquefied fluid supplied from the supercooler, and a secondary booster pump that secondarily boosts in pressure the primarily boosted liquefied fluid.

9. The liquefied fluid supply system according to claim 1, wherein the booster includes a single-stage booster pump that boosts the liquefied fluid supplied from the supercooler up to a supply pressure to the nozzle at once.

10. A liquefied fluid-spraying apparatus comprising:

a nozzle that sprays a liquefied fluid that vaporizes after spraying; and a liquefied fluid supply system according to claim 1, which supplies a liquefied fluid to the nozzle.

* * * * *